United States Patent [19]
Brady

[11] Patent Number: 5,862,380
[45] Date of Patent: Jan. 19, 1999

[54] TEST METHOD FOR REVISED DATA FIELDS IN A PROGRAM

[75] Inventor: James T. Brady, San Jose, Calif.

[73] Assignee: MatriDigm Corporation, Fremont, Calif.

[21] Appl. No.: 697,639

[22] Filed: Aug. 29, 1996

[51] Int. Cl.$^6$ .............................. G06F 9/45; G06F 17/30; G06F 17/00
[52] U.S. Cl. ............................................ 395/704; 707/101
[58] Field of Search .............................. 395/704; 707/101

[56] References Cited

U.S. PATENT DOCUMENTS 5,218,605  6/1993  Low et al. ............................... 395/183
5,673,387  9/1997  Chen et al. .............................. 395/183

OTHER PUBLICATIONS

Oram et al, Managing Projects with Make, O'Reilly & Assoc., pp. IX–X, Dec. 1991.
Letter to David N. Koffsky, May 14, 1996, from Donald F. Olker with attached Search Report (6 pages).
(A) Results of Database Search (7 pages).
(B) Results of Database Search (12 pages).
(C) Results of Database Search (24 pages).
(D) Results of Database Search (10 pages).

*Primary Examiner*—Alvin Obervley
*Assistant Examiner*—R. S. Rosenholm
*Attorney, Agent, or Firm*—Ohlandt, Greeley, Ruggiero & Perle

[57] ABSTRACT

A method determines if a revised fragment of a program provides an identical answer as does an original fragment of the program, wherein a fragment is one operator and one or more operands that are subject to processing by the operator. The method comprises the steps of: executing both an original fragment of the program and one or more revised fragment(s) which correspond to the original fragment, using first equvalent variables and determining if both fragments produce equivalent results; executing both the revised fragment(s) and the original fragment of the program using additional variables to determine if both fragments produce equivalent results under all test conditions; if the results are not equivalent, making a notation of that fact for later examination; and if the fragments are equivalent, repeating the aforementioned test steps until all revised code fragments have been tested.

10 Claims, 3 Drawing Sheets

TEST METHOD FOR REVISED DATA FIELDS IN A PROGRAM

FIELD OF THE INVENTION

This invention relates to avoidance of calculation ambiguities which result from the use of year dates from the year 2000 and forward and, more particularly, to an improved method for testing of revised year-related data fields in a program to assure that such revised fields produce the same results as original fields.

BACKGROUND OF THE INVENTION

Software applications use dates in many operations, from complex financial transactions to the calculation of expiration dates of drivers' licenses and credit cards. Many such applications base their calculations on dates and subtract two-digit year values to arrive at a calculation result. For example, calculations of interest on a 5-year certificate of deposit involve the subtraction of the certificate's issue date from the current date and a determination of interest based upon the difference value. This calculation is not a problem if the certificate matures in 1999, but if it matures in 2001, the same computation can result in an error message or worse. In the year 2000, the two-digit year indication starts over at "00" and unless something distinguishes such date, the year will appear to be the year 1900—or so it will seem to many programs that use only the year's last two digits for dates.

In the early days of data processing, storage space was at a premium and it was decided to use two digits for the year indication. Most programs today carry forward that format and employ two bytes of 8-bit binary data to indicate the last two-decimal values of the year. Many of these programs/applications were written years ago and the authors/programmers who understood their organization and details are no longer available for consultation. Further, calculations employing year fields are often deeply embedded in very large program routines and are thus difficult to find and identify.

The key to identifying year fields in a program, at a reasonable cost, is to do so automatically and avoid the need for programmers to scan the code.

Year fields are normally composites of sub-fields. That is, the fields used to represent "year", "month" and "day" are sub-fields of a larger field of "year". To identify such fields, two scan techniques are currently being used. The first examines the labels assigned to various data fields used by the program. In COBOL, these labels are found in the Data division which is the area of the program which defines each of the data elements used in the program. Using various techniques, key phrases like "year", "yr", etc. are located in the labels. These data fields are then considered to be year-oriented fields. As a further check, the format of each such "year-oriented" field is determined and is scanned to see if it meets one of the commonly used formats for year information. The most common format in use involves three two-digit numbers that are defined consecutively.

The application of this dual test allows a search of a program to be carried out and often leads to the discovery of approximately 80% of the year fields. Because such a search procedure does not consider the interrelationship of a discovered year field with other year fields, both in the same program and in allied programs in the same application, data that would allow a more accurate year field determination is ignored. In co-pending U.S. patent application Ser. No. 08/705,499 filed Aug. 29, 1996 now U.S. Pat. No. 5,794, 048, (Attorney docket 835.0003 USU) entitled "Method for Classification of Year-Related Data Fields in a Program", to the Inventor hereof, an improved method is disclosed for identifying year-related fields in a program. The method employs data available in associated fields and thereby assures a higher level of accuracy in the year field identification process. The disclosure of the aforementioned Patent Application is incorporated herein by reference.

The procedure described in the above-noted Patent Application enables identification of year fields with high probability, and thereafter enables each of those year fields to be automatically accessed and to have their year designation revised in such a manner as to enable a removal of the ambiguity which arises from the onset of the year 2000 and forward. A preferred method for revising the year format and for enabling the year conversion procedure is described in U.S. patent application Ser. No. 08/657,657 filed on May 30, 1996 now U.S. Pat. No. 5,758,336 (attorney docket 835.0001 USU) entitled "Date Format and Date Conversion Procedure" to the inventor hereof. The disclosure of the aforementioned patent application is incorporated herein by reference.

Notwithstanding that date fields can be identified and revised to avoid the "Year 2000" problem, once a code listing is revised, it must be tested to assure that the revised year fields produce correct results. However, the testing procedure itself can create a significant computing load if the number of test case combinations is too great. For instance, if a 25,000 line program in COBOL has a 5% date field density (average for COBOL programs), it will have about 250 input date fields. If each combination of variations of possible values for each date field are tested, an enormous number of tests can result (i.e., 10 to the 250th test cases). Obviously, such a computing load is unacceptable.

Accordingly, it is an object of this invention to provide a memory media which enables an improved method of testing a program whose date fields have been revised to avoid the "Year 2000" problem.

It is a further object of the invention to provide a method for testing a program having revised date fields and which imposes a reasonable processing load on the computer used to perform the testing.

SUMMARY OF THE INVENTION

A method determines if a revised fragment of a program provides an identical answer as does an original fragment of the program, wherein a fragment is one operator and one or more operands that are subject to processing by the operator. The method comprises the steps of: executing both an original fragment of the program and one or more revised fragment(s) which correspond to the original fragment, using first equvalent variables and determining if both fragments produce equivalent results; executing both the revised fragment(s) and the original fragment of the program using additional variables to determine if both fragments produce equivalent results under all test conditions; if the results are not equivalent, making a notation of that fact for later examination; and if the fragments are equivalent, repeating the aforementioned test steps until all revised code fragments have been tested.

DETAILED DESCRIPTION OF THE INVENTION

Figure 1:
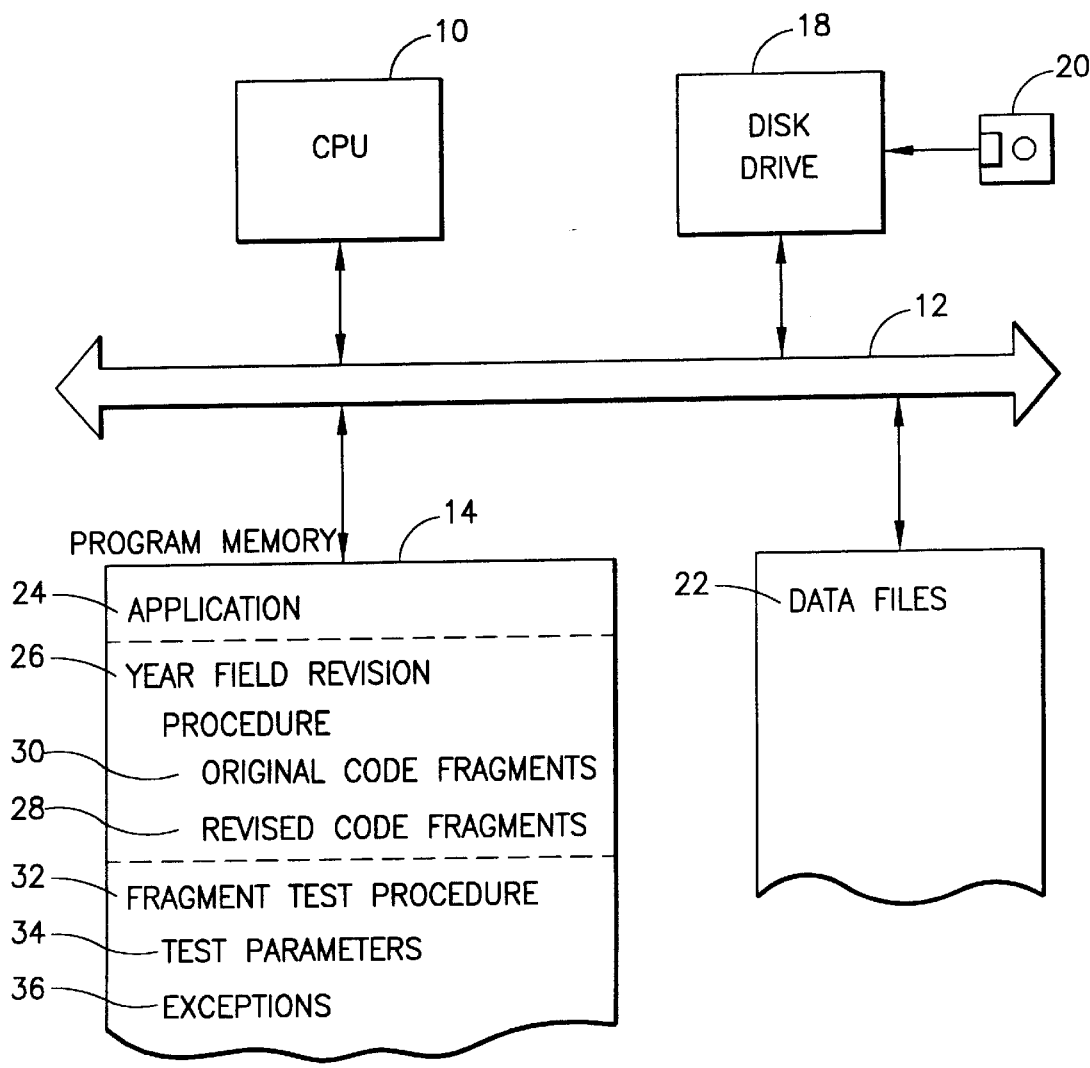
FIG. 1 is a block diagram of a computer system which is adapted to perform the method of the invention.

FIG. 1 illustrates a computer system adapted to carry out the method of the invention. A central processing unit (CPU) 10 is coupled by a bus system 12 to a program memory 14. A disk drive 18 is adapted to receive a disk memory 20 which contains software for controlling CPU 10 to perform the invention hereof. Disk drive 18 is coupled via bus system 12 to both program memory 14 and to a data file memory 22.

Program memory 14 includes an application 24 which has been operated upon by a year field revision procedure 26 to alter each of the fields therein which includes a year designation to a format which enables avoidance of the "year 2000" problem. During the process of modifying application 24, year field revision procedure 26 isolates each code fragment in application 24 which includes at least a data field and an operator. Each such data field is then examined and it is determined if it includes a year designation and if yes, the year designation is revised to a format which avoids the problem caused by the presently used two-digit year format.

Year field revision procedure 26, in addition to deriving revised code fragments 28 for use by application 24, also retains copies of the original code fragments 30 from application 24.

A fragment test procedure 32 with included test parameters 34 is stored in program memory 14 and operates upon both revised code fragments 28 and original code fragments 30 to determine that both provide equivalent results. For those program fragments which do not produce equivalent results when executed by fragment test procedure 32, an exception listing 36 is maintained in program memory 14 for later examination by a programmer.

Year field revision procedure 26 preferably follows the procedure described and claimed in the above noted application entitled "Method for Classification of Year-Related Data Fields in a Program" by the inventor hereof. Briefly stated, the aforementioned procedure examines an application and identifies operand fields therein which include a year value. An operand association table is also provided for each logical operator type and indicates, based upon interrelationships of operand labels associated with the operator, whether an associated operand that has been classified as a year field or a probable year field should be assigned a revised classification and what that revised classification should be.

The method reviews the application to identify each operand label which can initially be classified as a year field or probable year field. Each such operand is listed in an operand table. The method also reviews the application to identify every operator listed therein and lists each such operator and any associated operand labels in an operator table. Thereafter, association tables are utilized which identify possible combinations of year and probable year classified operands with an operator and, based upon such combinations, indicate revised classifications which are more logically probable from the operand combination.

Each such operator/operand entry in the operator table is examined in accordance with the association table for the particular operator. If the post analysis listings in the association table indicate that the classification of an operand should change, the revised classification is entered in the operand table.

Utilizing this procedure, all operator/operator code fragments are identified and are classified as year fields or probable year fields. Thereafter, each probable year field is examined by a programmer to determine, whether the classification of the field should be changed to a year field or a non-year field.

Subsequently, each identified operator/operand including a year field classification is subjected to the procedure described in the patent application referred to above and entitled "Date Format and Date Conversion Procedure" to the inventor hereof, wherein a revised binary year format is substituted in each identified code fragment that includes a year field. At such time, copies of both the original code fragment and the revised code fragment are placed in memory for later use in the test method illustrated in FIGS. 2a and 2b.

A code fragment includes at least an operator and an operand. An example of a COBOL statement that is a code fragment is as follows:

'ADD 1 TO YEAR-OF-BIRTH,

Other COBOL statements may contain multiple code fragments. An example which contains three code fragments is:

IF ORDER-MONTH IS GREATER THAN 12 THEN ADD 1 TO ORDER-YEAR, ORDER-MONTH=1

The three code fragments are (1) ORDER-MONTH IS GREATER THAN 12,
(2) ADD 1 TO ORDER-YEAR, and
(3) ORDER-MONTH=1.

When converting these code fragments to a four digit year, the second code fragment could be converted to:

CALL 'ADD-TO-YEAR' (ORDER-YEAR, 1)

Any transformation of a code fragment, to be a correct transformation, must produce the same or equivalent output as the original statement, given the same inputs.

Figure 2A:
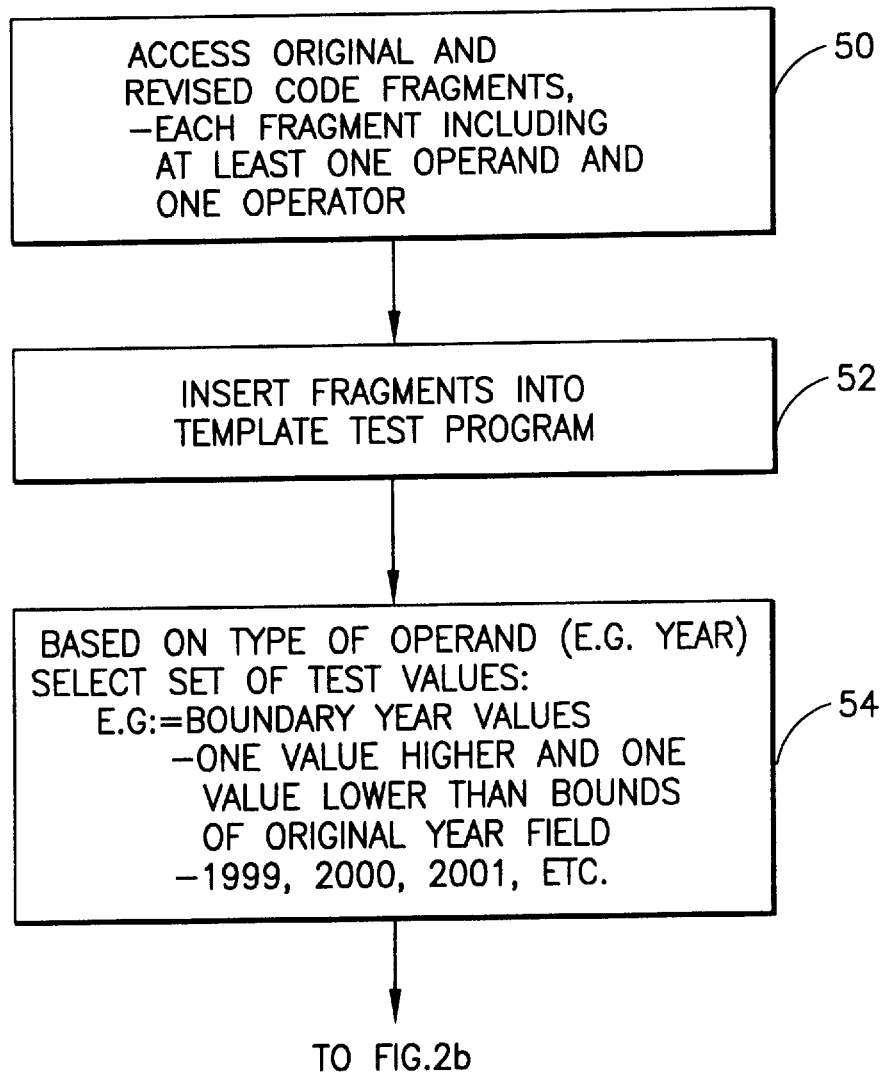
FIGS. 2a and 2b illustrate a logical flow diagram of the method of the invention.
Figure 2B:
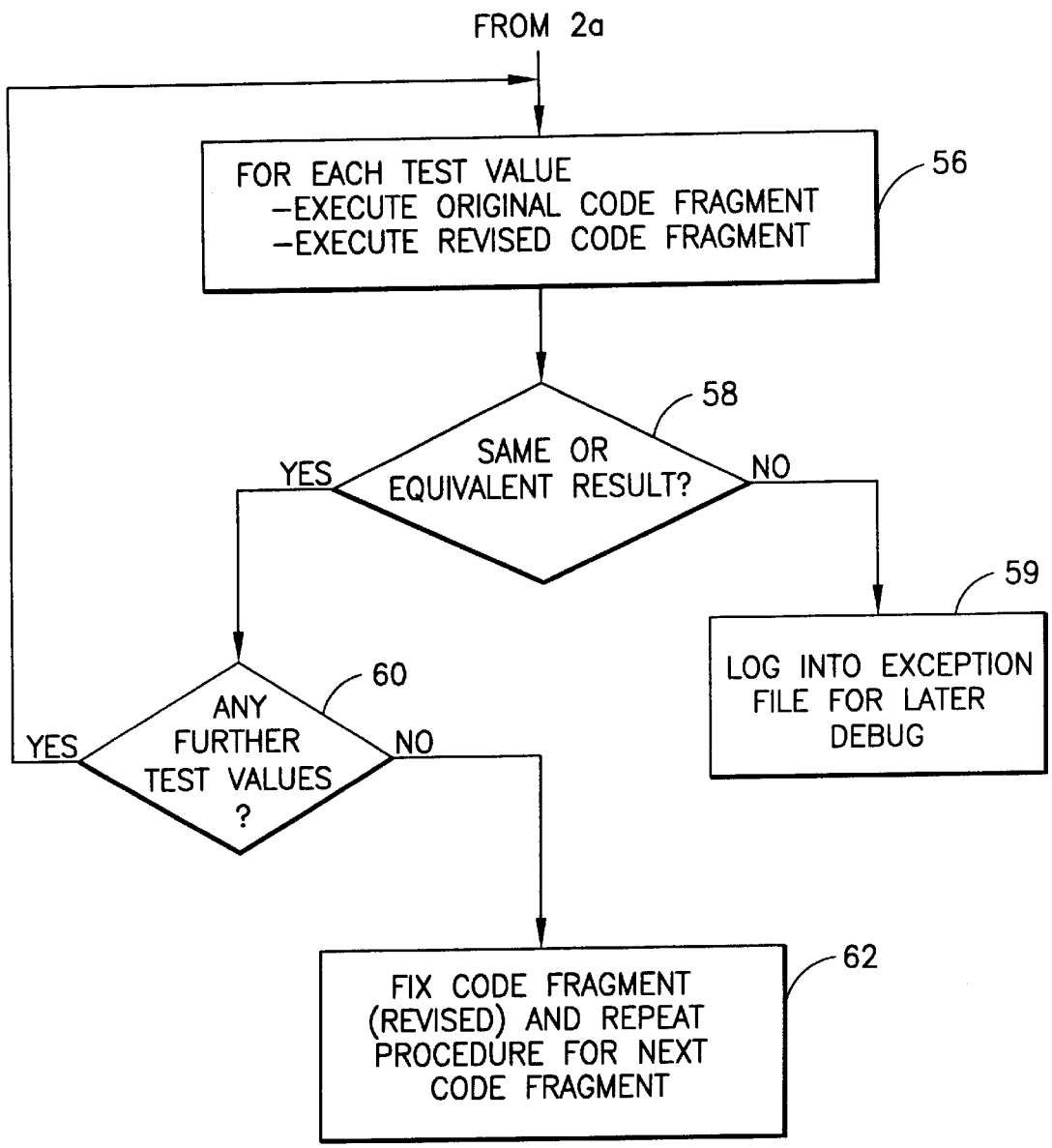

Turning to FIG. 2a, initially both an original and a corresponding revised code fragment are accessed. As indicated above, a code fragment includes at least one operator and one operand (see box 50). Both the original code fragment and the corresponding revised code fragment are then placed in a template program (box 52). The template program (an example of whose code is illustrated below) will test both the original code fragment and the revised code fragment to assure that the results which both generate are the same or equivalent.

It is to be understood that the results may not (and probably will not) take the same format, however, the results must be equivalent or else the test fails. More specifically, if a future date which includes a year designation is the result of the operator calculation, then the year format will differ for the original and revised code formats. Nevertheless, the results must be "equivalent" and "correct" in both instances for the test to be considered successful.

Once the original and revised code fragments have been placed in the template program, the "type" of data field is identified and an associated set of test values is accessed to be used in performing the validity test.

The identification as to field type is derived when the original data field is copied from the data definitions portion of the program, with the definition specifying the field type. While there are many field types, those most often used for dates are zoned decimal and packed decimal. For instance, "20 YEAR_OF _BIRTH PIC 99" defines YEAR_OF _BIRTH as zoned decimal because of the "PIC 99".

The set of test values includes all combinations of the lower and upper bounds of the valid data range for the original code fragment and at least one value in the middle of the valid data range. In addition, each field that is a year is tested for the years 1999, 2000 and 2001. This set of test values provides eight test points and if the original and revised code fragments provide equivalent results in all such cases, there is a very high probability that the revised code fragment will function correctly (box 54).

The template program then is executed and inserts a common test value in both the original code fragment and the revised code fragment and executes the operator which forms a portion of both code fragments (box 56). More specifically, a set of nested loops are generated within the program, one for each variable that has more than one test point. At the end of each loop, one or more IF statements are generated that verify that each test value combination produced the expected result. The generated test program is then compiled and executed.

As shown in decision box 58, the result produced by the execution of the original code fragment and the revised code fragment (with the same input test value), is examined to determine if it is the same or equivalent. If no, the code fragment is listed in an Exception listing for later examination. If yes, and no further test values remain to be processed (decision box 60), then the revised code fragment is accepted (box 62) and the procedure moves to the next set of fragments, original and revised (box 62). If there are further test values to be executed for both the original and revised code fragment, the procedure recycles and executes the test.

The key advantages of the above-noted procedure are the completeness of each test and a substantial reduction in the number of test case combinations that are required to test an entire program. Further, the test procedure takes advantage of the fact that both the original and revised code fragments must provide the same or equivalent results or else the test fails. Normal maintenance of programs results in old fragments and revised fragments having little or no relationship with one another, thereby requiring much larger sections of the program to be tested in order to determine whether the revision is accurate or not. Because of the many additional variables involved in such a test protocol, trouble-shooting of error conditions becomes extremely labor intensive and expensive.

While the above description includes an overall discussion of test values to be employed while examining both original and revised code fragments, the following are a preferred set of test values and include (1) boundary conditions; (2) invalid data; (3) certain common dates; and (4) "hot spots":

boundary conditions: 00, 01, 98, 99, 1601, 1602, 9998, 9999, 1999, 2000, 2001, 2100, 2400 and 4000;

invalid data: aa, AA, aaaa, AAAA, 1600, 0000;

'common' dates: (1957. 1996);

hot spots: derived from the computations involved with the specific date. Hot spot example:

IF PURCHASE DATE YEAR <(CURRENT-YEAR-5 ) THEN . . .

In this case, test cases are offset 4, 5 and 6 from the other valid test dates.

A test case uses about 10 values per operand, or 100 combinations and takes <0.5 seconds to generate and run on a personal computer.

Hereafter, is a pseudo code (COBOL-like) program for performing the invention, which utilizes 8 test values for each combination of an original code fragment and a revised code fragment.

```
IDENTIFICATION DIVISION . . .
ENVIRONMENT DIVISION . . .
DATA DIVISION
    WORKING-STORAGE-SECTION.
01      OLD-DATE-VARIABLES-USED-IN-CODE-FRAGMENTS
    10  OLD-DATE-VARIABLE-1          PIC 99
    10  OLD-DATE-VARIABLE-2          PIC 99
    10  OLD-DATE-VARIABLE-3          PIC 99
        . . .
01      NEW-DATA-VARIABLES-USED-IN-CODE-FRAGMENTS
    10  NEW-COMPUTATIONAL-           PIC 99
        VARIABLE-1
    10  NEW-COMPUTATIONAL-           PIC 99
        VARIABLE-2
    10  NEW-COMPUTATIONAL-           PIC 99
        VARIABLE-3
        . . .
PROCEDURE DIVISION
SET INDEX 1 EQUAL TO 1
SET INDEX 2 EQUAL TO 1
PERFORM UNTIL INDEX 1 = 7
    PERFORM UNTIL INDEX 2 = 7
        SETUP INPUTS
        OLD CODE FRAGMENT
        NEW CODE FRAGMENT
        PLACE INPUTS AND OUTPUTS IN RESULTS TABLE
        CHECK RESULTS TO SEE IF THEY ARE
        EQUIVALENT
        INCREMENT INDEX 2
    END PERFORM
    INCREMENT INDEX 1
END PERFORM
IF RESULTS FAIL, THEN OUTPUT TEST PROGRAM AND
RESULTS TABLE TO EXCEPTION FILE
IF RESULTS ARE OK, THEN LOG SUCCESSFUL COMPLETION
STOP
```

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for determining if a revised fragment in a program code listing provides an equivalent answer as does an original form of the fragment, wherein a fragment includes only one operator and one or more operands that are to be processed in accord with said one operator, said method comprising the steps of:

(a) reading said program code listing to identify operands therein;

(b) classifying said operands as being date-related datatypes or not;

(c) identifying an operator associated with each operand classified as a date-related datatype, said operator and one or more of said operands associated therewith each comprising a fragment;

(d) executing both an original fragment from said program code listing and one or more revised fragment(s) (hereafter "revised fragment(s)") which correspond to said original fragment, without executing remaining portions of said program code listing, using common test values that are valid for both fragments; and (e) determining if both the revised fragment(s) and the original fragment produce equivalent results.

2. The method as recited in claim 1, further comprising the steps of:

(f) executing both said revised fragment(s) and said original fragment using additional common test values valid for both fragments to determine if both said revised fragment(s) and said original fragment produce equivalent results; and (g) repeating steps d–g for further revised fragment(s) of the program.

3. The method as recited in claim 2, wherein if the result of step (e) or step (f) indicate that both fragments do not produce equivalent results, creating a log of said original fragment and revised fragment(s) for later examination.

4. The method as recited in claim 2 wherein at least certain fragments include a year value as an operand value.

5. The method as recited in claim 4 wherein said year value is revised to include at least one of the following values during an iteration of steps a–d: 00, 01, 98, 99, 1601, 1602, 9998, 9999, 1999, 2000, 2001, 2100, 2400 and 4000.

6. The method as recited in claim 4, wherein said year value is revised to include an invalid test value during repeated iteration of steps a–g.

7. A memory media including software for enabling a computer to determine if a revised fragment in a program code listing provides an equivalent answer as does an original form of the fragment, wherein a fragment of a program includes only one operator and one or more operands that are to be processed in accord with said one operator, said memory media comprising:

(a) means for enabling the computer to read said program code listing to identify operands therein;

(b) means for enabling the computer to classify said operands as being date-related datatypes or not;

(c) means for enabling the computer to identify an operator associated with each operand classified as a date-related datatype, said operator and one or more of said operands associated therewith each comprising a fragment;

(d) means for enabling the computer to execute both an original fragment from said program code listing and one or more revised fragment(s) (hereafter "revised fragment(s)") which correspond to said original fragment, without executing remaining portions of said program code listing, using common test values that are valid for both fragments; and (e) means for enabling the computer to determine if both the revised fragment(s) and the original fragment produce equivalent results.

8. The memory media as recited in claim 7, further comprising:

(f) means for causing the computer to execute both said revised fragment(s) and said original fragment using additional test values to determine if both said revised fragment(s) and said original fragment produce equivalent results; and (g) means for causing means d–f to operate upon further revised fragment(s) of the program.

9. The memory media as recited in claim 7, wherein if the result of the function of means (e) indicates that both fragments do not produce equivalent results, causing means (e) to create a log of such revised fragment(s) for later examination.

10. The memory media as recited in claim 8, wherein at least certain fragments include a year value as an operand value.

* * * * *